Jan. 12, 1954

H. W. WHITMORE 2,665,817

CRISPER PAN STRUCTURE

Filed Oct. 23, 1950

INVENTOR.
HARLAND W. WHITMORE
BY Whittemore,
Hulbert & Belknap
ATTORNEYS

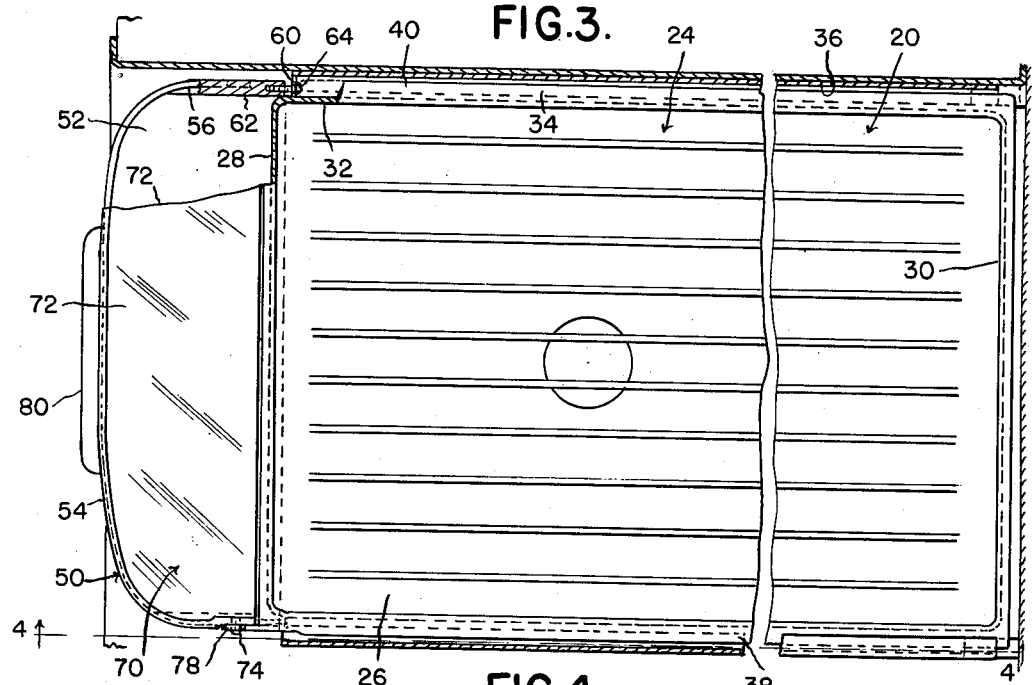
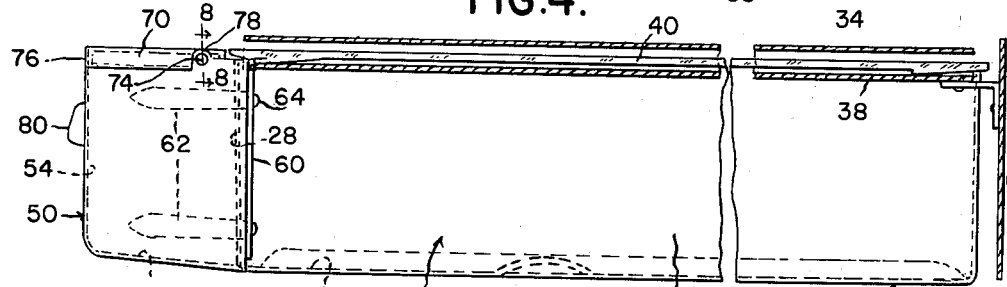
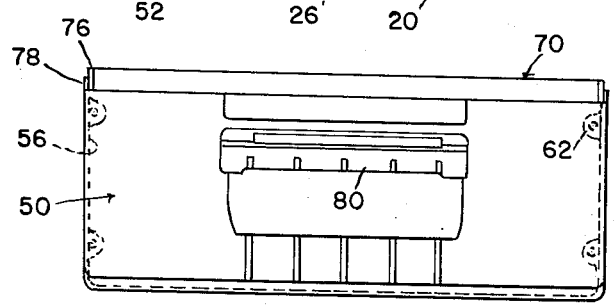

Patented Jan. 12, 1954

2,665,817

UNITED STATES PATENT OFFICE 2,665,817

CRISPER PAN STRUCTURE

Harland W. Whitmore, Kenosha, Wis., assignor to Motor Products Corporation, Detroit, Mich., a corporation of New York Application October 23, 1950, Serial No. 191,614

5 Claims. (Cl. 220—20)

The present invention relates to crisper pan structure and more particularly to crisper pan structure comprising a main crisper pan open at its top and adapted to be received beneath a glass shelf in a refrigerator, the shelf operating as a top closure for the main crisper pan, and an auxiliary crisper pan provided with a separate hinged cover and having bottom, front and side walls but being open at its rear, said auxiliary crisper pan being attached to the front end of said main crisper pan whereby the front wall of said main crisper pan serves as a rear wall or closure for the auxiliary crisper pan.

It is an object of the present invention to provide crisper pan structure comprising a main crisper pan carrying a relatively small auxiliary crisper pan at its front end.

It is a further object of the present invention to provide in combination a main and an auxiliary crisper pan, the auxiliary crisper pan having a separate hinged closure therefor.

It is a further object of the present invention to provide a main crisper pan having outwardly extending vertical flanges adjacent its front end, an auxiliary crisper pan having bottom, front and side walls, with the rear edges of the side walls of the auxiliary crisper pan being secured to the flanges of said main crisper pan.

It is a further object of the present invention to provide a novel hinged support for an auxiliary crisper pan.

It is a feature of the present invention to provide an auxiliary crisper pan composed of bottom, front and side walls, the side walls being provided with pin receiving openings adjacent their upper rear corners, a cover for said auxiliary crisper pan including outwardly extending hinge pins adjacent its rear corners, the side walls of said auxiliary crisper pan being relatively outwardly movable to receive the hinge pins of the cover therebetween to extend outwardly through the openings in the side walls of said auxiliary crisper pan, the side walls of said auxiliary crisper pan being thereafter attached to a main crisper pan and retained thereby against relative outward movement.

Other objects and features of the invention will become apparent as the description proceeds, especially when taken in conjunction with the accompanying drawings, wherein:

Figure 3 is an enlarged fragmentary horizontal sectional view on the line 3—3, Figure 2.

Figure 4 is a vertical section on the line 4—4, Figure 3.

Figure 5 is an enlarged front elevational view of the crisper pan structure removed from the refrigerator.

Figure 8 is an enlarged section on the line 8—8, Figure 4.

Figure 1:
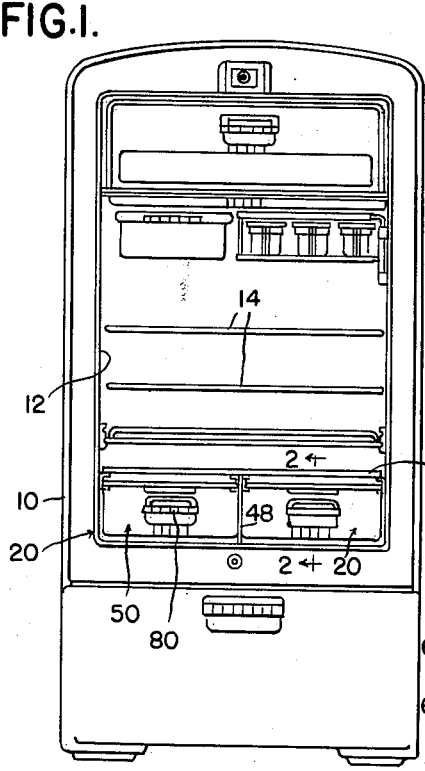
Figure 1 is a front elevational view of a refrigerator with the door removed, illustrating the location of the crisper pan structure therein.

Referring now to the drawings, in Figure 1 there is illustrated a refrigerator 10 having a large storage compartment 12 which includes a plurality of shelves 14 and a pair of crisper pan assemblies indicated generally at 20.

Figure 6:
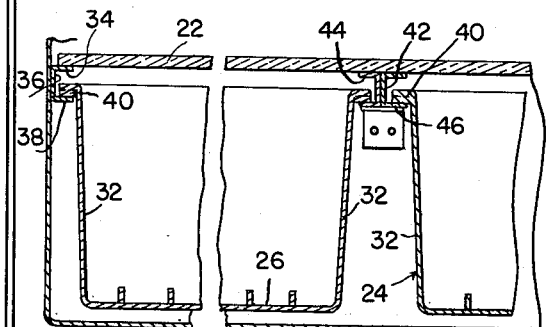
Figure 6 is a fragmentary sectional view on the line 6—6, Figure 2.
Figure 7:
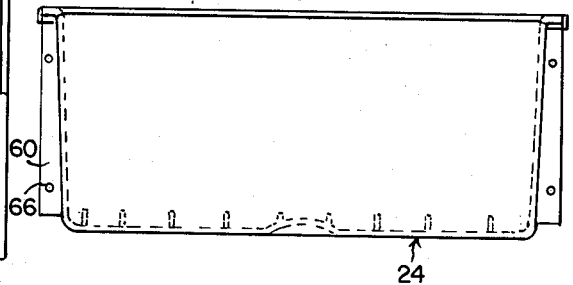
Figure 7 is a front elevational view of the main crisper pan with the auxiliary crisper pan removed.
Figure 2:
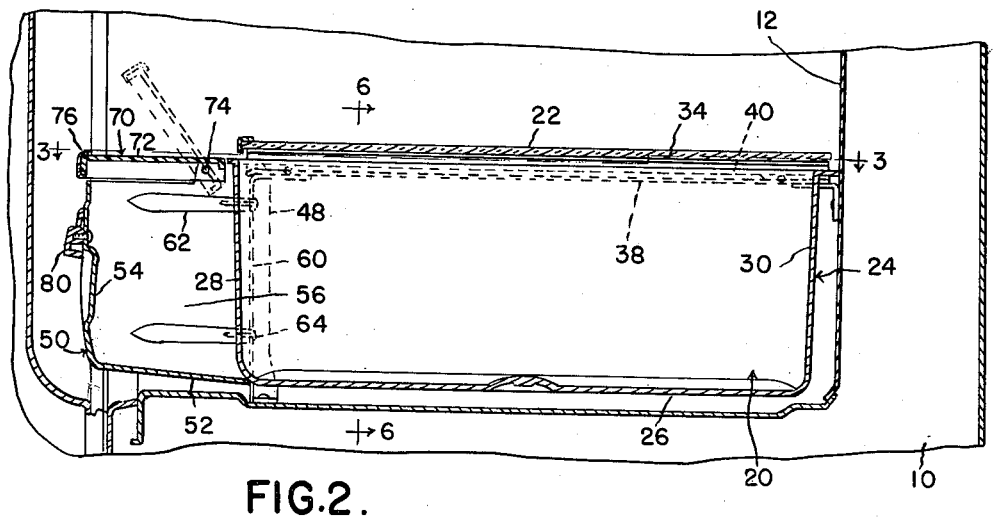
Figure 2 is an enlarged fragmentary section on the line 2—2, Figure 1.

As best seen in Figure 2, the food storage compartment 12 includes a mounting for a transparent shelf 22 which extends from the rear of the compartment to a point spaced substantially from the open front of the compartment and which extends substantially completely from side to side of the compartment. The crisper pan assembly comprises a main pan 24 having a bottom wall 26, a front wall 28, a rear wall 30, and side walls 32. The two crisper pans illustrated in Figure 1 are identical and the detailed description thereof will be limited to a single crisper pan. The transparent shelf 22, as best seen in Figure 6, is supported on top flanges 34 of side rails 36, the bottom flanges 38 of the rails supporting out-turned flanges 40 provided along the side walls 32 of the main crisper pan 24. Extending from front to rear of the main storage compartment is an intermediate rail structure comprising a pair of outwardly facing channels 42. The upper flanges 44 of channel members 42 constitute supports for the glass shelf 22 and the lower flanges 46 constitute supports on which the out-turned flanges 40 of the main crisper pan 24 are slidably engaged. The front ends of the channels 42 are supported by a post indicated generally at 48 in Figure 1.

As previously mentioned, the front edge of the transparent glass shelf 22 terminates short of the front of the storage compartment 12. The main crisper pan 24 is of such length that when it is in the retracted position best illustrated in Figure 2, the transparent glass shelf 22 constitutes a cover and partial closure therefor.

According to the present invention an auxiliary crisper pan indicated generally at 50, is provided. The auxiliary crisper pan comprises a bottom wall 52, a front wall 54, and side walls 56. The auxiliary crisper pan is open at its rear.

Located adjacent the front end of the main crisper pan 24 are a pair of vertical outwardly extending flanges 60. The side walls 56 of the auxiliary crisper pan 50 are provided with thickened ribs 62 having drilled threaded openings therein for the reception of screws 64 which extend through suitable openings 66 provided in the flanges 60 and into the threaded openings provided in the thickened ribs 62 of the auxiliary crisper pan. By means of this arrangement the auxiliary crisper pan 50 is closed at its rear, the front wall 28 of the main crisper pan thus serving as the rear wall of the auxiliary crisper pan.

The auxiliary crisper pan provides storage space for items which it is desired to retain in fresh crisp condition and it is necessary for this purpose to provide a top closure for the auxiliary crisper pan. In accomplishing this result a separate hinged cover 70 is provided for the auxiliary crisper pan which may be swung to the dotted line position best illustrated in Figure 2, to afford access to the interior of the auxiliary crisper pan, without the necessity of drawing the entire crisper pan structure forwardly. This renders it very easy to place and remove small items in the auxiliary crisper pan without the necessity of moving the complete structure.

The cover 70 comprises a transparent cover member 72 which may be formed of a suitable transparent plastic. As best seen in Figure 8 the transparent member 72 is provided with a pair of outwardly extending integral hinge pins 74 which constitute the pivot mounting for the cover. A metal trim strip 76 is provided which extends around the front and sides of the transparent cover member 72 and adjacent its rear ends, the strip 76 being provided with openings which permit the passage of the hinge pins 74 therethrough, as best seen in Figure 8. The side walls 56 of the auxiliary crisper pan include upwardly extending ears 78 as best seen in Figure 4, which are provided with openings adapted to receive pins 74. The hinge may readily be mounted on the auxiliary crisper pan structure prior to attachment of the auxiliary crisper pan to the main crisper pan. The side walls 56 of the auxiliary crisper pan, and particularly the top rear corners thereof, may be moved outwardly away from each other, since the side walls are not interconnected at the rear of the auxiliary crisper pan by a rear wall. Thus the pins 74 may readily be introduced into the openings provided in the ears 78, thus providing an extremely simple hinge support for the cover 70. Thereafter, the auxiliary crisper pan is attached to the main crisper pan by bringing the rear edges of its side walls 56 into contact with the front surface of the flanges 60 on the main crisper pan. Fastening screws 64 are then inserted through the openings 66 in the flanges and are threaded into the openings provided in the thickened ribs 62 formed in the side walls of the auxiliary crisper pan. Attachment of the auxiliary crisper pan to the main crisper pan thus provides rigid support for the rear top corners of the side walls 56 of the auxiliary crisper pan and accordingly, serve to prevent disengagement between the hinge pins 74 and the hinge openings provided in the ears 78 adjacent the top rear corners of the side walls 56 of the auxiliary crisper pan.

The front wall 54 of the auxiliary crisper pan 50 includes a handle 80 by means of which the crisper pan assembly may be drawn forwardly to afford access to the open top of the main crisper pan 24. The glass shelf 22 at this time remains stationary as previously described.

The drawings and the foregoing specification constitute a description of the improved crisper pan structure in such full, clear, concise and exact terms as to enable any person skilled in the art to practice the invention, the scope of which is indicated by the appended claims.

What I claim as my invention is:

1. A crisper pan assembly comprising an open topped main pan including a front wall, an auxiliary pan having bottom, front and side walls and being open at its top and rear, fastening means securing the rear edges of the side walls of said auxiliary pan to the front of said main pan so that the front wall of said main pan constitutes a rear wall for said auxiliary pan, the upper rear corner portions of the side walls of said auxiliary pan being laterally displaceable when said auxiliary pan is separated from said main pan, a cover for said auxiliary pan, and hinge means comprising hinge parts on the upper rear corner portions of the side walls of said auxiliary pan and adjacent the rear corners of said cover, said hinge parts including laterally overlapping portions engageable and disengageable by lateral displacement of the upper rear corner portions of the side walls of said auxiliary pan when said auxiliary pan is separated from said main pan, said fastening means including connecting members located adjacent the top rear corners of said side walls to prevent lateral displacement of said overlapping hinge portions.

2. Structure as defined in claim 1 in which said hinge parts comprise pins and pin receiving openings.

3. Structure as defined in claim 1 in which said hinge means comprise laterally outwardly extending pins on said cover and pin receiving openings in the upper rear corner portions of the side walls of said auxiliary pan.

4. Structure as defined in claim 3 in which said cover is formed of transparent material, and a trim strip extending along the front and side edges of said cover, said strip having openings adjacent its ends through which said pins extend to retain said trim strip in position.

5. Crisper pan structure comprising a main pan, an auxiliary pan open at its top and rear, said auxiliary pan being secured to the front wall of said main pan whereby the front wall of said main pan constitutes a rear wall for said auxiliary pan, a cover hinged to said auxiliary pan and including outwardly extending pins, the top rear portions of the side walls of said auxiliary pan having pin receiving openings therein, said cover being formed of transparent material, a metal strip extending around the front and both sides of said cover, said strip having openings through which said pins extend to thereby retain said strip in assembled position.

HARLAND W. WHITMORE.

References Cited in the file of this patent

UNITED STATES PATENTS

| Number | Name | Date |
|---|---|---|
| 414,702 | Grimm | Nov. 12, 1889 |
| 1,655,284 | Nelson | Jan. 3, 1928 |
| 1,825,464 | Lopez | Sept. 29, 1931 |
| 2,100,992 | Woodhead et al. | Nov. 30, 1937 |
| 2,309,217 | Ruthenburg | Jan. 26, 1943 |
| 2,338,889 | Yoxsimer | Jan. 11, 1944 |
| 2,350,463 | Kallus | June 6, 1944 |

FOREIGN PATENTS

| Number | Country | Date |
|---|---|---|
| 18,821 | Great Britain | 1905 |